(12) United States Patent
Westhues et al.

(10) Patent No.: US 11,361,384 B1
(45) Date of Patent: Jun. 14, 2022

(54) METHODS AND SYSTEMS FOR PROVIDING SEAMLESS CUSTOMER EXPERIENCE TRANSACTIONS

(71) Applicant: STATE FARM MUTUAL AUTOMOBILE INSURANCE COMPANY, Bloomington, IL (US)

(72) Inventors: John Westhues, Normal, IL (US); Leann Dionesotes, Bloomington, IL (US); David Ruby, Normal, IL (US); John Dillard, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 20 days.

(21) Appl. No.: 16/411,555

(22) Filed: May 14, 2019

Related U.S. Application Data

(60) Provisional application No. 62/671,153, filed on May 14, 2018.

(51) Int. Cl.
   *G06Q 40/08* (2012.01)
   *G06Q 30/00* (2012.01)

(52) U.S. Cl.
   CPC ........... *G06Q 40/08* (2013.01); *G06Q 30/016* (2013.01)

(58) Field of Classification Search
   CPC .......................... G06Q 40/08; G06Q 30/016
   See application file for complete search history.

(56) References Cited

U.S. PATENT DOCUMENTS

| | | | | |
|---|---|---|---|---|
| 8,666,786 | B1* | 3/2014 | Wirz | G06Q 40/08 705/30 |
| 10,719,501 | B1* | 7/2020 | Leise | G06F 16/9027 |
| 2002/0035528 | A1* | 3/2002 | Simpson | G06Q 40/00 705/35 |
| 2002/0049618 | A1* | 4/2002 | McClure | G06Q 40/08 705/4 |
| 2005/0246206 | A1* | 11/2005 | Obora | G06Q 10/10 705/4 |
| 2006/0047540 | A1* | 3/2006 | Hutten | G06Q 40/08 345/619 |
| 2007/0185743 | A1* | 8/2007 | Jinks | G06Q 40/08 705/4 |
| 2009/0177499 | A1* | 7/2009 | Westerberg | G06Q 40/08 705/4 |
| 2012/0143634 | A1* | 6/2012 | Beyda | G06Q 10/06 705/4 |
| 2015/0317741 | A1* | 11/2015 | Muxfeld | G06Q 40/08 705/4 |
| 2019/0244301 | A1* | 8/2019 | Seth | G06F 16/73 |

\* cited by examiner

*Primary Examiner* — Scott C Anderson
*Assistant Examiner* — Matthew Cobb
(74) *Attorney, Agent, or Firm* — Marshall, Gerstein & Borun LLP

(57) ABSTRACT

Systems and methods are disclosed with respect to providing seamless customer experience transactions, in particular, linking disparate systems to facilitate a lower friction customer experience. An exemplary embodiment includes receiving recorded data from one or more connected devices at a geographic location; analyzing the recorded data, wherein analyzing the recorded data includes determining that an collision has occurred involving one or more vehicles; generating a transaction including the data indicative of the collision based upon the analysis; and transmitting the transaction to at least one other participant in the distributed ledger network.

20 Claims, 3 Drawing Sheets

METHODS AND SYSTEMS FOR PROVIDING SEAMLESS CUSTOMER EXPERIENCE TRANSACTIONS

CROSS-REFERENCE TO RELATED APPLICATION

The present application claims priority to U.S. Application No. 62/671,153, filed May 14, 2018. The priority application, U.S. 62/671,153 is hereby incorporated by reference.

TECHNICAL FIELD

Systems and methods are disclosed with respect to providing seamless customer experience transactions, in particular, linking disparate systems to facilitate a lower friction customer experience.

BACKGROUND

When an accident occurs, a loss report associated with that accident must be created to send to an insurance company for claims processing. This loss report may require data from multiple sources, such as the insurance customer, and employees of the insurance company. This reporting function can be tedious and error prone, because often times the relevant data must be entered more than once across a wide variety of systems by a variety of different sources.

BRIEF SUMMARY

In one aspect, a computer-implemented method for extending a customer relationship management platform may be provided. The method may include, via one or more local or remote processors, servers, sensors, and/or associated transceivers: receiving, at one or more processors, a customer loss report dataset from a user, wherein the customer loss report dataset has an associated insurance customer, and data indicative of an intake system; analyzing, at the one or more processors, the customer loss report dataset to determine relevant customer loss reporting data; generating, at the one or more processors, a customer loss report transaction including the relevant customer loss report data based upon the analysis; and transmitting, at the one or more processors, the customer loss report transaction to a customer relationship management platform. The method may include additional, less, or alternate actions, including those discussed elsewhere herein.

The methods may be implemented via computer systems, and may include additional, fewer, or alternate actions or functionality. Systems or computer-readable media storing instructions for implementing all or part of the method described above may also be provided in some aspects. Systems for implementing such methods may include one or more of the following: a special-purpose computing device, a personal electronic device, a mobile device, a wearable device, a processing unit of a vehicle, a remote server, one or more sensors, one or more communication modules configured to communicate wirelessly via radio links, radio frequency links, and/or wireless communication channels, and/or one or more program memories coupled to one or more processors of the personal electronic device, processing unit of the vehicle, or remote server. Such program memories may store instructions to cause the one or more processors to implement part or all of the method described above. Additional or alternative features described herein below may be included in some aspects.

This summary is provided to introduce a selection of concepts in a simplified form that are further described in the Detailed Descriptions. This summary is not intended to identify key features or essential features of the claimed subject matter, nor is it intended to be used to limit the scope of the claimed subject matter.

Advantages will become more apparent to those of ordinary skill in the art from the following description of the preferred aspects, which have been shown and described by way of illustration. As will be realized, the present aspects may be capable of other and different aspects, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and are instrumentalities shown, wherein.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

Systems and methods are disclosed with respect to providing seamless customer experience transactions, in particular, linking disparate systems to facilitate a lower friction customer experience. In particular, the systems and methods disclosed herein relate to problems with various access points, i.e. data sources, feeding data into a loss reporting system.

Generally speaking, the systems and methods disclosed herein provide solutions to the problems discussed herein, by "handing off" a loss report started by an insurance customer (or agent) to an insurance claim handler so that the entire process of filing out a loss report does not have to be restarted. One way to solve this problem is by prepopulating information from intake systems into each subsequent system in a loss reporting systems. This information may in some cases be automatically collected at the location of a loss by leveraging sensors located in a customer's mobile phone, as well as applications a customer may have installed on their phone. The systems and methods discussed herein cause the customer, or an insurance agent, or insurance associate, to have a seamless experience without having to perform manual reentry of information when reporting their loss.

Figure 1:
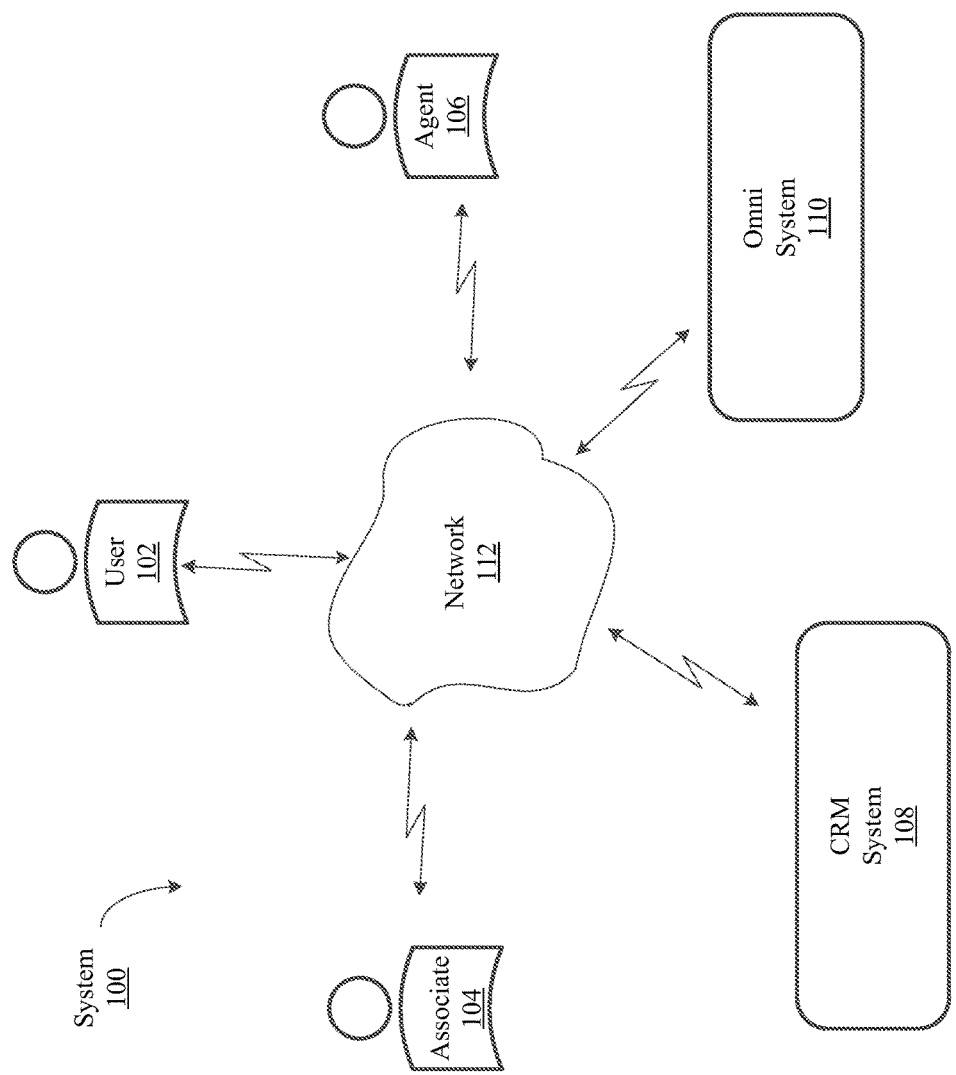
FIG. 1 depicts an exemplary system for providing seamless customer experience transactions, in accordance with one aspect of the present disclosure.

FIG. 1 depicts an exemplary system 100 for providing seamless customer experience transactions, in accordance with one aspect of the present disclosure. The system may include a user 102, an associate 104, an agent 106, a customer relationship management (CRM) system 108, an omni system 110, and a network 112. The user 102, an associate 104, an agent 106, a CRM system 108, an omni system 110 may all connect to each other through the network 112, which may, for example, be the Internet, or another type of distributed network. In some embodiments, the associate 104, and the agent 106, utilize computer systems that are on the same network owned by the same entity, such as an insurance company. The associate 104 and the agent 106 may be employees of said insurance company. Accordingly, in some embodiments the user 102 may be a customer of the insurance company that the associate 104 and agent 106 work for. In some cases, the CRM system 108, and/or the omni system 110 may include one or more local or remote processors, servers, sensors, and/or associated transceivers.

In one embodiment, the system 100 may operate to provide a seamless customer experience. The user 102 may be a customer of an insurance company. The user 102 may be contacting their insurance company to report a loss on a vehicle, or in some cases a house, etc., that they own. The user 102 may be attempting to report this loss in a variety of ways: via an application on their mobile phone, via a phone call with either the associate 104, or 106, via a website run by their insurance company, as well as other methods. In reporting the loss, the user 102 may enter a variety of data relevant to the loss. Any of the data types listed herein may be reportable by the user depending on the circumstances. The user 102 may, however, reach a point where the system they are using to input data, for example an intake system, cannot handle the next step in the loss reporting process. As such, the input data needs to be transmitted to the appropriate system. In this scenario, the omni system 110 may operate to fill this need.

The omni system 110 may operate as an in-between layer that takes data input by the user 102 and transmits it to the necessary system for the loss reporting process to continue as needed. To achieve this end the omni system 110 must be connected to the various data entry points for the system (e.g. user 102, associate 104, and/or agent 106), as well as be connected to the CRM system 108. In this way, the omni system 110 operates as a type of middleware that helps facilitate data connections between the various actors in the system 100. The benefit to the system 100, as well as to the user 102, associate 104, and agent 106, is two-fold. First, the omni system 110 solves the technical problem of facilitating data exchange between parties without the need for manual input, but also the omni system 110 provides a benefit to the user 102, such that their experience reporting the loss is seamless, faster, and less work for the user 102.

For example, the omni system 110 may be "listening" to the various actors in the system 100, and when a loss reporting event occurs the omni system 110 may take data that is input by a user 102, and/or the associate 104, or agent 106, and transfer that data from the intake system to the CRM system 108. When this occurs, whoever input the data may see that this data has been transferred to the next system in the loss reporting system, and in some cases the user may be able to see any changes being made to the input data as those changes occur. The same type of scenario may play out where an associate 104, or an agent 106 is inputting data about a loss report, and that data needs to be input automatically to another system not under their control. Alternatively, the omni system 110 may be deployed on computer systems that each of the user 102, associate 104, and/or agent 106 are utilizing.

Figure 2:
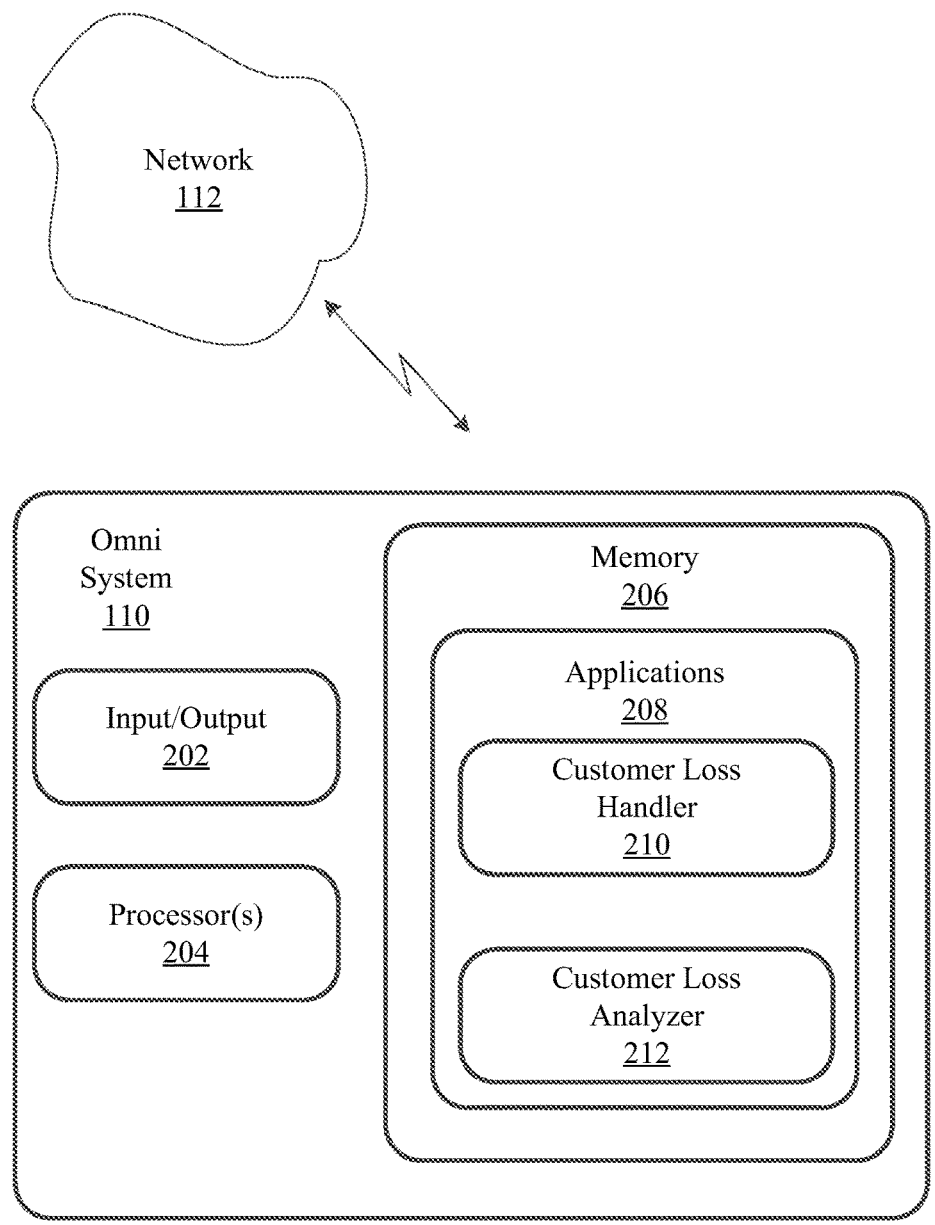
FIG. 2 depicts an exemplary computer system for use in providing seamless customer experience transactions, in accordance with one aspect of the present disclosure.

FIG. 2 depicts an exemplary computer system 110 for use in providing seamless customer experience transactions, in accordance with one aspect of the present disclosure. The computer system 110 may be the omni system 110 from FIG. 1. The omni system may include input/output systems 202, one or more processors 204, and one or more memories 206. The memory 206 may store one or more applications 208. In some embodiments, the one or more applications 208 may include a customer loss handler 210, and a customer loss analyzer 212. The omni system 110 depicted in FIG. 2 may include additional, fewer, or alternative components, including those described elsewhere herein.

In some embodiments, the customer loss handler 210 may receive data indicating that a loss report is being filed out. The handler 210 may then collect the necessary data that will be used to prepopulate the loss report at the next stage of the loss reporting system. The customer loss analyzer 212 may analyze the data indicating that a loss report is being filed out to ensure that all the necessary data is collected. Similarly, the customer loss analyzer 212 may request that additional data be collected to facilitate the loss reporting process. This data may be data that is relevant to an accident, but may also be data that is required by other systems in the loss reporting system.

In some cases, the customer loss handler 210 and/or the customer loss analyzer 212 may be separate systems from the omni system 110, and each component may include one or more local or remote processors, servers, sensors, and/or associated transceivers.

Figure 3:
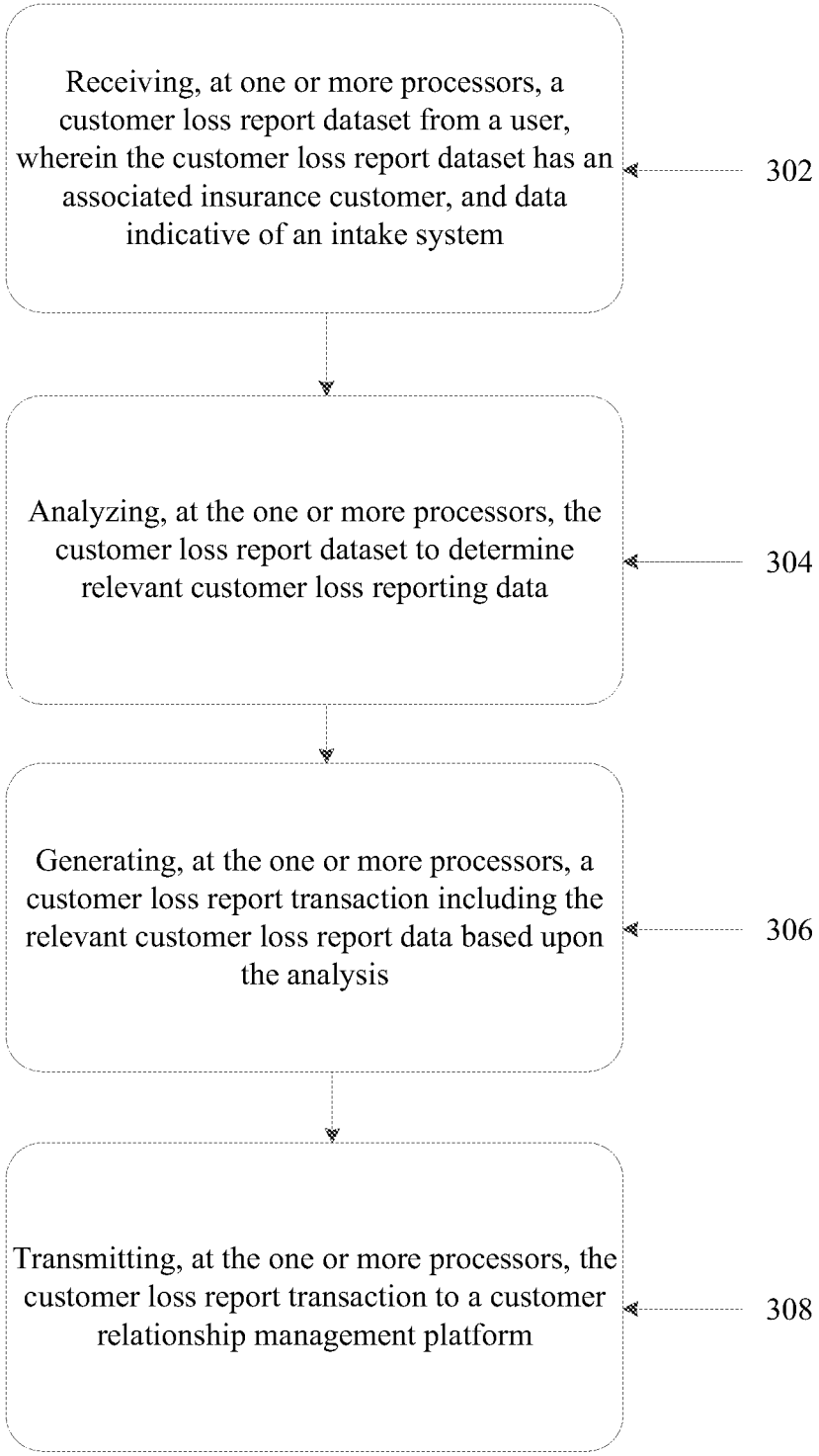
FIG. 3 depicts an exemplary method for providing seamless customer experience transactions, in accordance with one aspect of the present disclosure.

FIG. 3 depicts an exemplary method 300 for providing seamless customer experience transactions, in accordance with one aspect of the present disclosure. The method depicted in FIG. 3 is one exemplary implementation, whereas alternative methods and systems are discussed below. In some embodiments, the method depicted may make use of systems and components depicted in FIG. 1. The steps of the computer-implemented method 300 may be performed by the systems and components depicted in FIG. 1, and/or in conjunction with the systems and components depicted in FIG. 2. The method 300 may include additional, fewer, or alternative actions, including those described elsewhere herein.

An exemplary computer-implemented method 300 for providing seamless customer experience transactions is disclosed. The method 300 may include receiving, at one or more processors, a customer loss report dataset from a user, wherein the customer loss report dataset has an associated insurance customer, and data indicative of an intake system at block 302; analyzing, at the one or more processors, the customer loss report dataset to determine relevant customer loss reporting data at block 304; generating, at the one or more processors, a customer loss report transaction including the relevant customer loss report data based upon the analysis at block 306; and transmitting, at the one or more processors, the customer loss report transaction to a customer relationship management platform at block 308.

In one embodiment, the customer loss report dataset includes biographical data on an insurance customer, policy information data for an associated insurance customer, relevant insurance employee data associated with the associated insurance customer, and combinations thereof.

In one embodiment, the data indicative of an intake system indicates the customer loss report dataset was input at a website. In another embodiment, the data indicative of an intake system indicates the customer loss report dataset was input by an insurance agent via a customer management system. In yet another embodiment, the data indicative of an intake system indicates the customer loss report dataset was input by an insurance customer via a mobile device. In one embodiment, the data indicative of an intake system indicates the customer loss report dataset was input by an insurance associate via a customer management system.

In one embodiment, the customer loss report dataset includes a loss report location. Accordingly, in some embodiments, the loss report location is based on customer profile data, geolocation data associated with the mobile device, sensor data collected at the mobile device, and combinations thereof.

In some embodiments, the method may include performing a check to ensure that an accident checklist is filled out prior to sending information to a customer relationship management platform, or any other program. The accident checklist may allow for collecting data and photos prior to starting a loss report and populate the intake system that a user is uses to report the loss. Similarly, there may be systems and methods that automatically identify vehicle year, make, model, and input the vehicle data automatically within the loss report.

In other embodiments, the data may be transmitted to another software program than a customer relationship management platform. For example, the data included in the customer loss report transaction may be transmitted to their insurance agent, or to an insurance associate, or claims handler for further processing. Similarly, in some cases the data may be collect by an insurance agent and the data is then transmitted to an insurance associate, or claims handler.

In one embodiment of the method, the method further includes presenting, at one or more user input devices via the one or more processors, data entry activities related to the customer loss report to the user. In one embodiment, the data entry activities are received from an insurance agent, insurance associate, automated intelligent agent program, or combinations thereof.

In a different embodiment, a computer system for providing seamless customer experience transactions is disclosed. The system may include a network interface configured to interface with a processor; one or more sensors; a memory configured to store non-transitory computer executable instructions and configured to interface with the processor; and the processor configured to interface with the memory. Furthermore, the processor may be configured to execute the non-transitory computer executable instructions to cause the processor to: receive a customer loss report dataset from a user, wherein the customer loss report dataset has an associated insurance customer, and data indicative of an intake system; analyze the customer loss report dataset to determine relevant customer loss reporting data; generate a customer loss report transaction including the relevant customer loss report data based upon the analysis; and transmit the customer loss report transaction to a customer relationship management platform.

This detailed description is to be construed as exemplary only and does not describe every possible embodiment, as describing every possible embodiment would be impractical, if not impossible. One may be implement numerous alternate embodiments, using either current technology or technology developed after the filing date of this application.

With the foregoing, a user may be an insurance customer who may opt-in to rewards, insurance discount, or other type of program. After the insurance customer provides their affirmative consent, an insurance provider remote server may collect data from the customer's mobile device, smart home controller, smart or autonomous vehicle, or other smart devices—such as with the customer's permission or affirmative consent. The data collected may be related to smart or autonomous vehicle functionality, smart home functionality (or home occupant preferences or preference profiles), smart or autonomous vehicle functionality, and/or insured assets before (and/or after) an insurance-related event, including those events discussed elsewhere herein. In return, risk averse insureds, vehicle owners, home owners, or home, apartment, or vehicle occupants may receive discounts or insurance cost savings related to home, renters, personal articles, auto, mobile, and other types of insurance from the insurance provider.

In one aspect, smart or autonomous vehicle data, smart or interconnected home data, and/or other data, including the types of data discussed elsewhere herein, may be collected or received by an insurance provider remote server, such as via direct or indirect wireless communication or data transmission from a smart or autonomous vehicle, smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home, apartment, or vehicle occupants.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "includes," "comprising," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed:

1. A computer-implemented method for providing seamless customer experience transactions by facilitating data exchange without requiring manual input, the method comprising:
    receiving, at one or more processors, a customer loss report dataset from a user,
        wherein the customer loss report dataset has an associated insurance customer, and data indicative of an intake system, and
        wherein the receiving includes automatically collecting information at a location of a loss corresponding to the customer loss report dataset via one or more sensors located in a mobile computing device of the user;
    listening, via an omni system middleware communicatively coupled via an electronic network to a customer relationship management system, to the intake system;
    analyzing, at the one or more processors, the customer loss report dataset to determine relevant customer loss reporting data;
    generating, at the one or more processors, a customer loss report transaction including the relevant customer loss report data based upon the analyzing;
    determining that the customer loss report dataset has been received; and
    in response to determining, based on the intake system requiring manual input, that the intake system cannot handle a next step in a loss reporting process,
        transmitting, at the one or more processors, the customer loss report transaction via the electronic network to the customer relationship management system.

2. The computer-implemented method of claim 1, wherein the customer loss report dataset includes biographical data on the associated insurance customer, policy information data for the associated insurance customer, relevant insurance employee data associated with the associated insurance customer, or combinations thereof.

3. The computer-implemented method of claim 1, wherein the data indicative of the intake system indicates the customer loss report dataset was inputted at a website.

4. The computer-implemented method of claim 1, wherein the data indicative of the intake system indicates the customer loss report dataset was inputted by an insurance agent via the customer relationship management system.

5. The computer-implemented method of claim 1, wherein the data indicative of the intake system indicates the customer loss report dataset was inputted by the associated insurance customer via the mobile computing device.

6. The computer-implemented method of claim 5, wherein the customer loss report dataset includes the location.

7. The computer-implemented method of claim 6, wherein the location is based on customer profile data, geolocation data associated with the mobile computing device, sensor data collected at the mobile computing device, or combinations thereof.

8. The computer-implemented method of claim 1, wherein the data indicative of the intake system indicates the customer loss report dataset was inputted by an insurance associate via the customer relationship management system.

9. The computer-implemented method of claim 1, further comprising:
    presenting, at one or more user input devices via the one or more processors, data entry activities related to the customer loss report to the user.

10. The computer-implemented method of claim 9, wherein the data entry activities are received from an insurance agent, insurance associate, automated intelligent agent program, or combinations thereof.

11. A computer system for providing seamless customer experience transactions by facilitating data exchange without requiring manual input, the system comprising:
    a network interface configured to interface with a processor;
    one or more sensors;
    a memory configured to store non-transitory computer executable instructions and configured to interface with the processor; and
    the processor configured to interface with the memory, wherein the processor is configured to execute the non-transitory computer executable instructions to cause the processor to:
    receive a customer loss report dataset from a user, wherein the customer loss report dataset has an associated insurance customer, and data indicative of an intake system;
    automatically collect, via the one or more sensors, information at a location of a loss corresponding to the loss report dataset;
    listening, via an omni system middleware communicatively coupled via the network interface to a customer relationship management system, to the intake system;
    analyze the customer loss report dataset to determine relevant customer loss reporting data;
    generate, a customer loss report transaction including the relevant customer loss report data based upon the analyzing;
    determine that the customer loss report dataset has been received; and
    determine, based on the intake system requiring manual input, that the intake system cannot handle a next step in a loss reporting process; and
    transmit, in response to determining that the intake system cannot handle a next step in a loss reporting process, the customer loss report transaction via the network interface to the customer relationship management system.

12. The computer system of claim 11, wherein the customer loss report dataset includes biographical data on the associated insurance customer, policy information data for the associated insurance customer, relevant insurance employee data associated with the associated insurance customer, or combinations thereof.

13. The computer system of claim 11, wherein the data indicative of the intake system indicates the customer loss report dataset was inputted at a website.

14. The computer system of claim 11, wherein the data indicative of the intake system indicates the customer loss report dataset was inputted by an insurance agent via the customer relationship management system.

15. The computer system of claim 11, wherein the data indicative of the intake system indicates the customer loss report dataset was inputted by the associated insurance customer via a mobile computing device.

16. The computer system of claim 15, wherein the customer loss report dataset includes the location.

17. The computer system of claim 16, wherein the location is based on customer profile data, geolocation data associated with the mobile computing device, sensor data collected at the mobile computing device, or combinations thereof.

18. The computer system of claim 11, wherein the data indicative of the intake system indicates the customer loss report dataset was inputted by an insurance associate via the customer relationship management system.

19. The computer system of claim 11, wherein the processor is further configured to execute the non-transitory computer executable instructions to cause the processor to:
   present data entry activities related to the customer loss report to the user.

20. The computer system of claim 19, wherein the data entry activities are received from an insurance agent, insurance associate, automated intelligent agent program, or combinations thereof.

* * * * *